United States Patent [19]
Le et al.

[11] Patent Number: 5,956,197
[45] Date of Patent: Sep. 21, 1999

[54] SYSTEM FOR READING MAGNETIC INFORMATION PROVIDED WITH A THERMAL ASPERITY DETECTOR

[75] Inventors: Luan Le; Eric Desbonnets, both of Caen, France

[73] Assignee: U.S. Philips Corporation, New York, N.Y.

[21] Appl. No.: 08/838,483

[22] Filed: Apr. 7, 1997

[30] Foreign Application Priority Data

Apr. 17, 1996 [FR] France ................................. 96 04801

[51] Int. Cl.⁶ ..................................................... G11B 5/02
[52] U.S. Cl. ............................... 360/67; 360/46; 360/113
[58] Field of Search .............................. 360/113, 46, 67, 360/77.03; 324/207.12; 327/73, 91, 65

[56] References Cited

U.S. PATENT DOCUMENTS

| | | | |
|---|---|---|---|
| 5,216,561 | 6/1993 | Jagielinski | 360/113 |
| 5,351,003 | 9/1994 | Bauer et al. | 324/207.12 |
| 5,420,736 | 5/1995 | Heim et al. | |
| 5,715,110 | 2/1998 | Nishiyama et al. | 360/67 |
| 5,751,510 | 5/1998 | Smith et al. | 360/77.03 X |

FOREIGN PATENT DOCUMENTS

| | | |
|---|---|---|
| 353852 | 2/1990 | European Pat. Off. . |
| 439299 | 7/1991 | European Pat. Off. . |
| 61-284819 | 5/1987 | Japan . |
| 6-34645 | 5/1994 | Japan . |
| 2281654 | 3/1995 | United Kingdom . |

*Primary Examiner*—Aristotelis M. Psitos
*Assistant Examiner*—Patrick Wamsley
*Attorney, Agent, or Firm*—Steven S. Rubin

[57] ABSTRACT

The invention relates to a system for reading magnetic information, comprising at least one read head H0 provided with two magnetoresistive rods (MR10, MR20) whose electrical resistivities (RMR10, RMR20) vary in mutually opposite senses when they are subjected to a same variation in magnetic field. According to the invention, the reading system comprises a detection module DET which comprises two resistors R of substantially the same resistance value, an amplifier A having one input and one output, and a comparator Cp having two inputs and one output. Each resistor R has a terminal connected to the output terminal (M10, M20) of one of the magnetoresistive rods, while the other terminals of the resistors are interconnected so as to form a common junction point NC. The voltage of the common junction point NC is amplified and compared with a reference voltage Vref by the comparator Cp. The output of the comparator Cp signals an accidental contact between the read head and a foreign body or asperity which may be present on the surface on which the information is stored.

4 Claims, 3 Drawing Sheets

SYSTEM FOR READING MAGNETIC INFORMATION PROVIDED WITH A THERMAL ASPERITY DETECTOR

BACKGROUND OF THE INVENTION

1. Field of the Invention

The invention relates to a reading system for magnetic information comprising at least one read head provided with two magnetoresistive rods whose electrical resistivities vary in opposite senses from one another when they are submitted to a same variation in magnetic field, each magnetoresistive rod having a first and a second connection terminals, the first connection terminal being connected to a negative supply terminal, the second connection terminal, called output terminal of the magnetoresistive rod, being connected via a current source to a positive supply terminal, which read head is in addition provided with a differential amplifier having two inputs each of which is connected to the output terminal of one of the magnetoresistive rods.

2. Description of the Related Art

Such a reading system is known from U.S. Pat. No. 5,420,736. This reading system is, in theory, insensitive to an accidental contact between the read head and a foreign body or asperity which might be present on the surface on which the information is stored. Indeed when such an event takes place, referred to as "thermal asperity" hereinafter, it generates a sudden increase in the resistivity of the magnetoresistive rods. As a result, a sudden increase in voltage will then appear at the output terminal of each magnetoresistive rod. Since the resistivity increases have the same amplitude for the two magnetoresistive rods, the voltage increases also have the same amplitude. The differential amplifier which receives the voltages from the output terminals of the magnetoresistive rods has a high common mode rejection ratio, so that these identical increases of the input voltages of the differential amplifier will be ignored.

It is nevertheless useful to monitor such events. Too violent or repeated contacts between the read head and foreign bodies or asperities present on the surface on which the data are stored are capable of damaging the read head or at least giving rise to reading errors, or also of changing the data stored in the locations where these contacts take place. A control device governing the reading system, if informed of a thermal asperity, may choose to ignore the data read at the locations where this event takes place, or command the read head to skip the location where this event has taken place in future, or alternatively may rearrange the storage of data such that it is no longer necessary to guide the read head over this location. The present invention accordingly has for its object to enable the reading system to detect and signal thermal asperities.

SUMMARY OF THE INVENTION

To achieve this object, a reading system according to the invention is characterized in that it comprises a detection module having two inputs and one output, each of said inputs being connected to the output terminal of one of the magnetoresistive rods, which detection module includes two resistors of substantially equal resistance value, an amplifier having one input and one output, and a comparator having two inputs and one output, each resistor having a connection terminal connected to an input of the detection module, the other terminals of the resistors being connected jointly and forming a common junction point, which common junction point is connected via a first series capacitor to the input of the amplifier whose output is connected via a second series capacitor to an input of the comparator whose other input receives a reference voltage, the output of said comparator forming the output of the detection module.

The amplitude of the voltage variation caused by a thermal asperity at the terminals of the magnetoresistive rods may vary by 25% up to 200% from the rated amplitude of the voltage variations caused by the variations in the values of the magnetic data encountered in the course of the normal operation of the reading system. The effect of the thermal asperity is the more important as the contact between the read head and the asperity or foreign body is more violent. The adjustment of the reference voltage renders it possible to determine the tolerance threshold for thermal asperities.

In a special embodiment of the invention, a reading system as described above is characterized in that the detection module comprises a programmable register, called reference register, having N outputs and a digital/analog converter having N inputs and one output, said reference register containing a digital representation of the reference voltage, while the N outputs of the reference register are connected to the N inputs of the digital/analog converter whose output is connected to that one of the inputs of the comparator which is to receive the reference voltage.

Such an arrangement renders possible a flexible control, for example implemented by software means, of the tolerance threshold for thermal asperities of the reading system.

Most reading systems for magnetic information utilize several read heads distributed in such a manner that each and every zone of the surface where the information is stored can be accessed as rapidly as possible. At a given moment t, only that read head which belongs to the zone where the information which the control device demands to be read is.

An advantageous embodiment of the invention accordingly comprises a reading system as described above and characterized in that it comprises P read heads, P being higher than or equal to 2, and a selection module having P pairs of input terminals and two output terminals, which selection module comprises a programmable register, or selection register, having K outputs and a decoder having K inputs and P outputs, the K outputs of the selection register being connected to the K inputs of the decoder, and which selection module comprises P pairs of switches which are each controlled by one of the P outputs of the decoder, each pair of switches having a pair of inputs and a pair of outputs, the P pairs of inputs of the switches being connected to the P pairs of input terminals of the selection module, while each of the P pairs of outputs of the P pairs of switches is connected to the two output terminals of the selection module, each of the P pairs of input terminals of the selection module being connected to output terminals of the magnetoresistive rods of each of the P read heads, the two output terminals of the selection module being connected to the two inputs of the detection module.

Such a reading system accordingly needs only a single detection module for all read heads together. The control device not only determines which of the read head must be used for carrying out the reading operation, but at the same time can also select the output terminals of the corresponding magnetoresistive rods by software means, entering into the selection register the digital value which will enable the decoder to control the P pairs of switches such that only the signals present at the output terminals of the magnetoresistive rods of the active read head will enter the detection module.

BRIEF DESCRIPTION OF THE DRAWINGS

The invention will now be explained in more detail below with reference to a few embodiments, which are given purely by way of example, and the attached drawings, in which.

DESCRIPTION OF THE PREFERRED EMBODIMENTS

Figure 1:
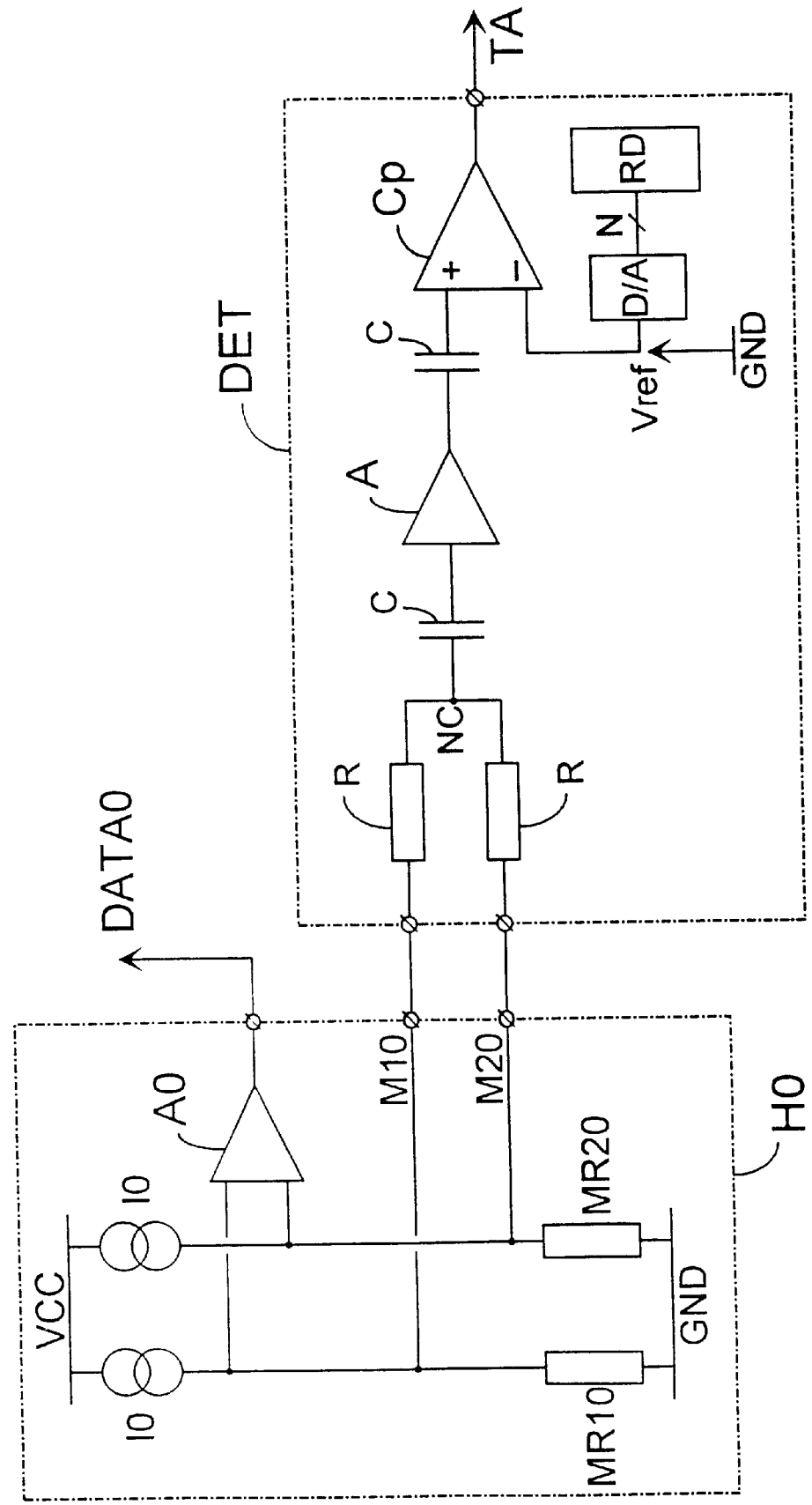
FIG. 1 is a partial circuit diagram of a reading system according to the invention.

FIG. 1 shows a part of a reading system for magnetic data according to the invention. Such a reading system comprises at least one read head H0 provided with two magnetoresistive rods (MR10, MR20) whose electrical resistivities (RMR10, RMR20) vary in mutually opposite senses when they are submitted to a same variation in magnetic field. Each magnetoresistive rod (MR10, MR20) has a first and a second connection terminal. The first connection terminal is connected to a negative supply terminal GND, the second connection terminal (M10, M20) called output terminal of the magnetoresistive rod, is connected via a current source I0 to a positive supply terminal VCC. The read head H0 is in addition provided with a differential amplifier A0 which has two inputs, each of which is connected to a respective output terminal (M10, M20) of one of the magnetoresistive rods. The reading system comprises a module DET called detection module, which has two inputs and one output. Each of these inputs is connected to a respective output terminal (M10, M20) of the magnetoresistive rods. The detection module comprises two resistors R of substantially the same resistance value, an amplifier A having one input and one output, and a comparator Cp having two inputs and one output. Each resistor R has a terminal connected to an input of the detection module, while the other terminals of the resistors are interconnected so as to form a common junction point NC. The common junction point NC is connected via a first series capacitor C to the input of the amplifier A whose output is connected via a second series capacitor C to an input of the comparator Cp, the latter receiving a reference voltage Vref at its other input. The output of the comparator Cp forms the output of the detection module DET. The detection module DET in addition comprises a programmable register RD called reference register, which has N outputs, and a digital/analog converter D/A which has N inputs and one output. The reference register RD contains a digital representation of the reference voltage Vref. The N outputs of the reference register RD are connected to the N inputs of the digital/analog converter D/A, whose output is connected to that one of the inputs of the comparator Cp which is to receive the reference voltage Vref.

Figure 2:
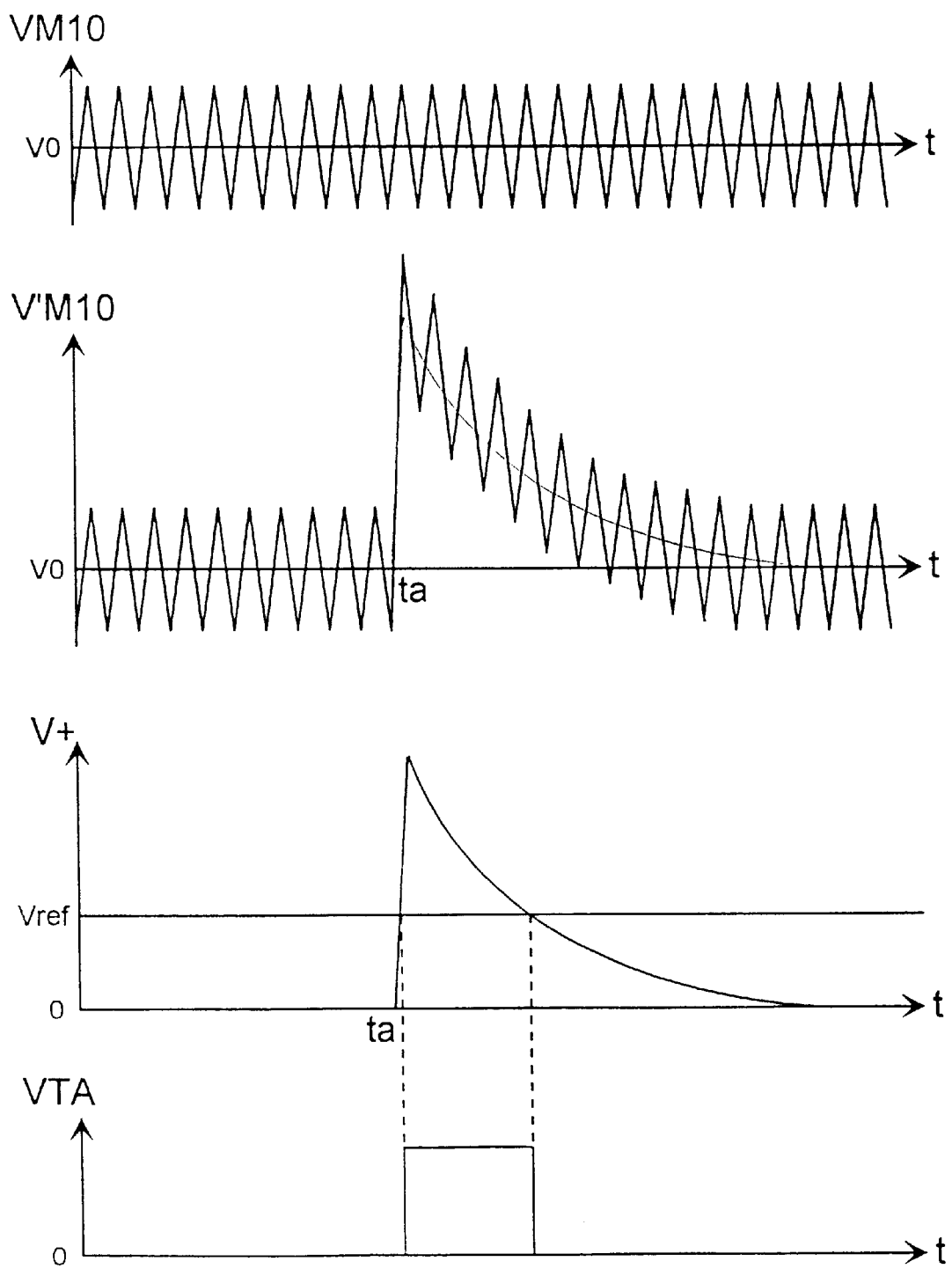
FIG. 2 shows a number of curves illustrating the gradients of various signals present in a reading system according to the invention.

FIG. 2 serves to show the gradients of various signals present in a reading system according to the invention. The signal VM10 represents the voltage which is supplied by terminal M10 during normal operation of the reading system. This voltage shows oscillations around a constant value V0. If RMR10=RMR20=RMR, then V0=RMR.I0. The oscillations are representative of local variations in the magnetic field to which the read head H0 is subjected during its displacement over the surface on which the data are stored. A signal VM20, not shown here, which would illustrate the gradient of the voltage supplied by the terminal M20 would show oscillations similar to those of VM10 around the same constant value V0, but in phase opposition to the latter. The signal V'M10 represents the voltage supplied by the terminal M10 when a thermal asperity arises. This voltage shows oscillations around V0 up to the moment ta when the thermal asperity causes a sudden increase in the resistivity of the magnetoresistive rod MR10, which manifests itself in a sudden rise in the output voltage of this rod. The resistivity of the magnetoresistive rod MR10 is besides still dependent on local variations in the magnetic field to which the read head H0 is submitted in the course of its displacement over the surface on which the data are stored. The signal V'M10 accordingly still shows oscillations, but this time around a voltage which shows a peak before gradually dropping towards V0. An extreme case has been shown here for greater clarity, where the amplitude of the voltage variation caused by the thermal asperity is of the order of 200% of the nominal amplitude of the voltage variations caused by the variations in the values of the magnetic data encountered during normal operation of the reading system. A signal V'M20, not shown here, which would illustrate the gradient of the voltage supplied by terminal M20 in the same situation would show oscillations similar to those of V'M10, but in phase opposition to the latter, around the same constant value V0 up to the moment ta and then around the same voltage peak and progressively decreasing towards V0. The signal V+ represents the voltage received by the comparator at its non-inverting input, compared with the reference voltage Vref. Since the resistors present in the detection module have the same resistance value R, the phase-opposed oscillations cancel one another out and the voltage supplied by the common junction point NC is the resultant value of the constant voltage V0 to which is added the voltage peak caused by the thermal asperity. The first series capacitor eliminates the DC component, i.e. the constant voltage V0. The amplifier A amplifies the signal representing the thermal asperity. The second series capacitor serves to eliminate any DC component which may have arisen from this amplification. The signal V+ thus obtained is then compared with the reference voltage Vref by the comparator Cp. This value Vref determines a threshold beyond which the effects of the thermal asperity will be taken into account. It characterizes accordingly the degree to which the thermal asperity is significant. From the point where V+ exceeds Vref, the signal VTA supplied by output TA of the detection module changes to the logic level "1", signalizing that a significant thermal asperity has been detected.

Figure 3:
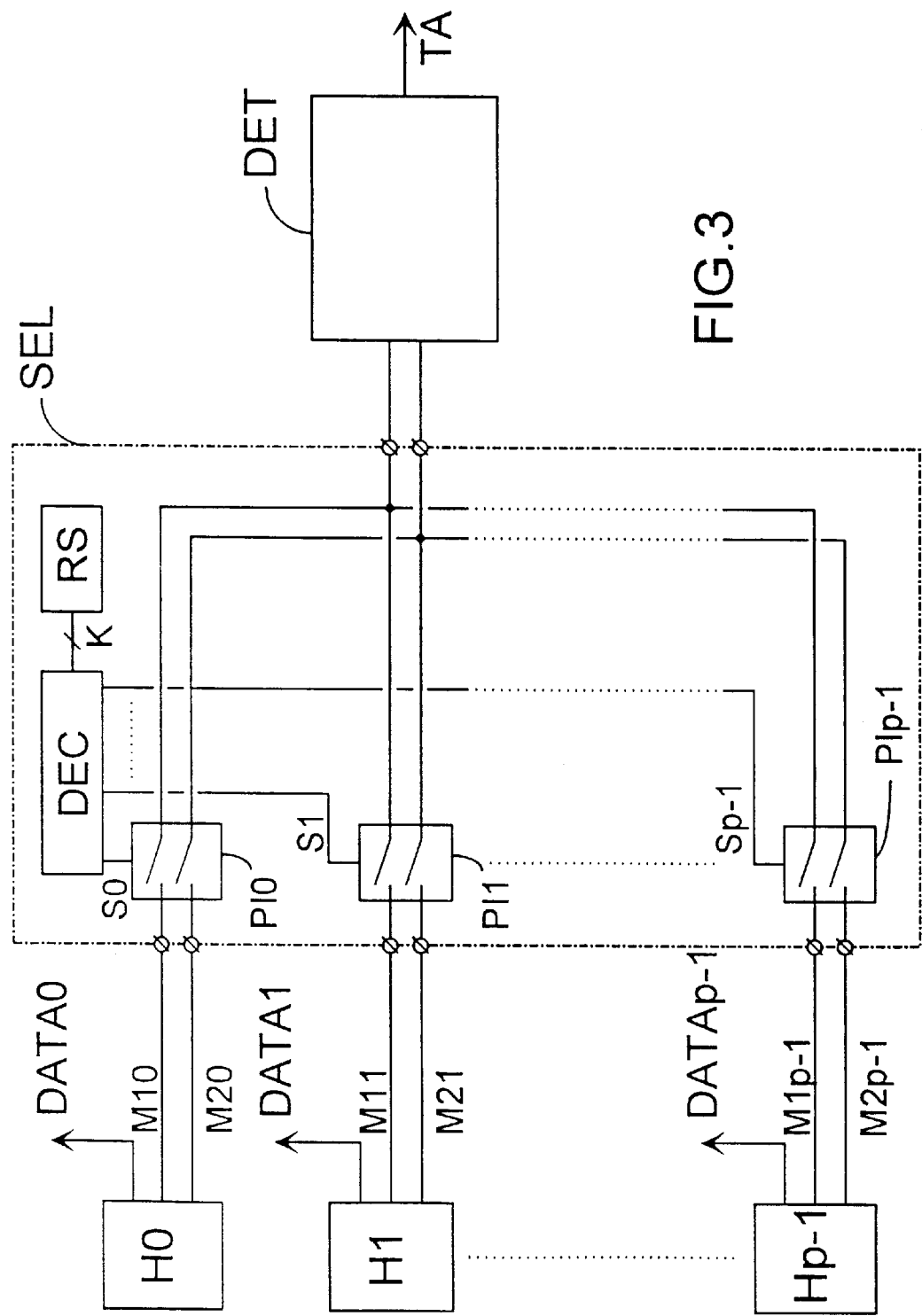
FIG. 3 is a partial circuit diagram of a reading system in an advantageous embodiment of the invention.

FIG. 3 shows part of a reading system according to an advantageous embodiment of the invention. Such a reading system comprises P read heads (H0 . . . Hp−1), P being greater than or equal to 2, and a module SEL, called selection module, having P pairs of input terminals and two output terminals. The selection module SEL comprises a programmable register RS called selection register, having K outputs, and a decoder DEC having K inputs and P outputs (S0 . . . Sp−1). The K outputs of the selection register RS are connected to the K inputs of decoder DEC. The selection module SEL comprises P pairs of switches (PI0 . . . PIp−1), each controlled by one of the P outputs (S0 . . . Sp−1) of the decoder DEC. Each pair of switches (PI0 . . . PIp−1) comprises a pair of inputs and a pair of outputs, the P pairs of inputs of the switches being connected to the P pairs of input terminals of the selection module. Each of the P pairs of outputs of the P pairs of switches (PI0 . . . PIp−1) is connected to the two output terminals of the selection module. Each of the P pairs of input terminals of the selection module is connected to output terminals ((M1j, M2j) with j=0 to p−1) of the magnetoresistive rods of each of the P read heads (H0 . . . Hp−1). The two output terminals of the selection module SEL are connected to the two inputs of the detection module DET. The selection register RS in such a reading system contains the digital value which enables the decoder DEC to control the P pairs of switches (PI0 . . . PIp–1) so that only the signals present at the output terminals of the magnetoresistive rods of the active read head will enter the detection module.

We claim:

1. A reading system for magnetic information comprising at least one read head provided with two magnetoresistive rods whose electrical resistivities vary in opposite senses from one another when they are submitted to a same variation in magnetic field, each magnetoresistive rod having a first and a second connection terminals, the first connection terminal being connected to a negative supply terminal, the second connection terminal, called output terminal of the magnetoresistive rod, being connected via a current source to a positive supply terminal, which read head is in addition provided with a differential amplifier having two inputs each of which is connected to the output terminal of one of the magnetoresistive rods, which reading system is characterized in that it comprises a detection module having two inputs and one output, each of said inputs being connected to the output terminal of one of the magnetoresistive rods, which detection module includes two resistors of substantially equal resistance value, an amplifier having one input and one output, and a comparator having two inputs and one output, each resistor having a connection terminal connected to an input of the detection module, the other terminals of the resistors being connected jointly and forming a common junction point, which common junction point is connected via a first series capacitor to the input of the amplifier whose output is connected via a second series capacitor to an input of the comparator whose other input receives a reference voltage, the output of said comparator forming the output of the detection module.

2. A reading system as claimed in claim 1, characterized in that the detection module comprises a programmable register, called reference register, having N outputs and a digital/analog converter having N inputs and one output, said reference register containing a digital representation of the reference voltage, while the N outputs of the reference register are connected to the N inputs of the digital/analog converter, said converter's output is connected to that one of the inputs of the comparator which is to receive the reference voltage.

3. A reading system as claimed in claim 1, characterized in that it comprises P read heads, P being higher than or equal to 2, and a selection module having P pairs of input terminals and two output terminals, which selection module comprises a programmable register, called selection register, having K outputs, and a decoder having K inputs and P outputs, the K outputs of the selection register being connected to the K inputs of the decoder, and which selection module comprises P pairs of switches which are each controlled by one of the P outputs of the decoder, each pair of switches having a pair of inputs and a pair of outputs, the P pairs of inputs of the switches being connected to the P pairs of input terminals of the selection module, while each of the P pairs of outputs of the P pairs of switches is connected to the two output terminals of the selection module, each of the P pairs of input terminals of the selection module being connected to output terminals of the magnetoresistive rods of each of the P read heads, and the two output terminals of the selection module being connected to the two inputs of the detection module.

4. A reading system as claimed in claim 2, characterized in that it comprises P read heads, P being higher than or equal to 2, and a selection module having P pairs of input terminals and two output terminals, which selection module comprises a programmable register, called selection register, having K outputs, and a decoder having K inputs and P outputs, the K outputs of the selection register being connected to the K inputs of the decoder, and which selection module comprises P pairs of switches which are each controlled by one of the P outputs of the decoder, each pair of switches having a pair of inputs and a pair of outputs, the P pairs of inputs of the switches being connected to the P pairs of input terminals of the selection module, while each of the P pairs of outputs of the P pairs of switches is connected to the two output terminals of the selection module, each of the P pairs of input terminals of the selection module being connected to output terminals of the magnetoresistive rods of each of the P read heads, and the two output terminals of the selection module being connected to the two inputs of the detection module.

* * * * *